Figure 1:
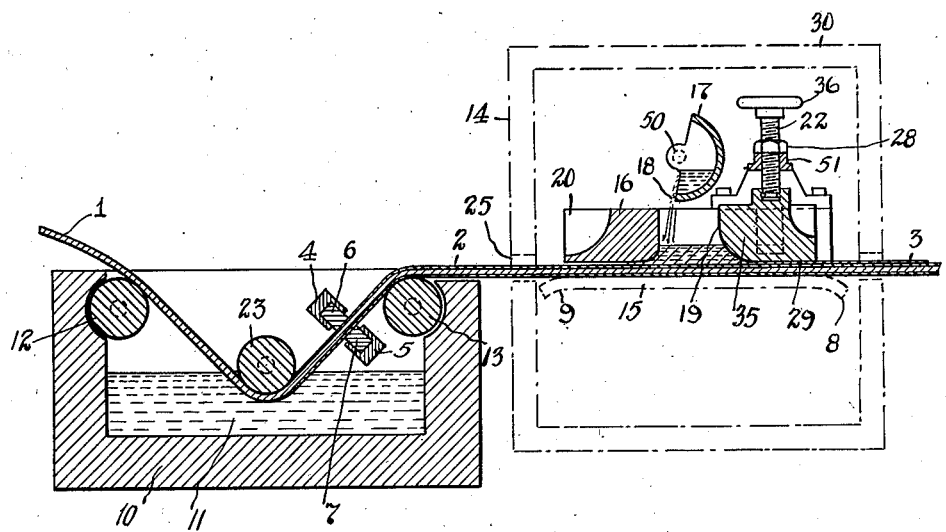

Sept. 24, 1935.   J. V. O. PALM   2,015,154

APPARATUS FOR MAKING BEARINGS

Original Filed Oct. 1, 1930

INVENTOR.
John V. O. Palm
BY
Fay, Oberlin & Fay
ATTORNEYS

Patented Sept. 24, 1935

2,015,154

UNITED STATES PATENT OFFICE

2,015,154

APPARATUS FOR MAKING BEARINGS

John V. O. Palm, Cleveland Heights, Ohio, assignor to The Cleveland Graphite Bronze Company, Cleveland, Ohio, a corporation of Ohio Original application October 1, 1930, Serial No. 485,695. Divided and this application August 4, 1933, Serial No. 683,643

3 Claims. (Cl. 207—11)

This invention relating, as indicated, to bearing manufacture is more particularly directed to a novel apparatus for producing journal bearings, as distinguished from ball and roller bearings.

This application is a division of my co-pending application filed October 1, 1930, Serial No. 485,695.

Ordinarily, the housings which receive bearings are castings and the bearing material which may be babbitt is poured against the housing, this process being quite costly because of the fact that the babbitt must be of considerable thickness, due to the irregularity of the cast housing surface, and also because the housings are sometimes of relatively large proportions, and placing them in a position to line with babbitt in such bearings of the prior art is also objectionable because babbitt is soft and a thick layer is subject to distortion from radial pressure more easily than a thin lining of babbitt backed with hard material.

A second well known method, which has supplanted to a large extent the above mentioned pouring method, in the bearing industry, is to line a thick layer of brass with babbitt, but the resulting bearing is very expensive because of the cost of the brass. It has been found that steel may be lined with babbitt or bronze, and that the thickness of the steel as compared with that of the brass may be materially reduced. The resulting bearing is very cheap to produce as far as the materials are concerned, but the problem is how to unite these two metals, which have such different properties, so that the cost of such union plus the cost of materials is less than the total cost of a lined housing or a lined brass backed bearing. I have found that either bronze, or babbitt, or other suitable bearing material in the form of strips, may be united to steel, and that this thickness of the babbitt or equivalent bearing material may be materially reduced and yet such a bearing will outlast a thick, cast bearing, and in the event of replacement the cost is only a fraction of what it would be under former conditions.

A further and important objection to replacing wornout bearings by casting is that the process of casting, being carried out in small shops under all sorts of conditions, produces a bearing lining the structure of which is far from uniform as compared to a lining produced in the factory under controlled conditions, where the bearing has a structure of just the desired character. This will be appreciated by taking the main bearing of an automobile, for example, which is usually cast in the block. If this bearing becomes worn, the block has to be taken out, all the old babbitt removed, and then the bearing housing is cast with babbitt. With the use of my improved thin wall bearings, all of this labor is avoided and the cost of material is less, since part of the space which was formerly occupied by babbitt, a very expensive material, is now taken up by steel. The reference to the use of my bearing in an automobile is only intended as a means of illustration and I do not wish to be limited to the use of my improved bearing in automobiles.

In this particular instance, I have aimed to provide a means of coating a strip of steel with tin and of superposing a layer of babbitt on the upper tinned surface of the steel, this babbitt layer being poured in such a manner that no additional mechanical means are necessary to press or to form a composite strip. In other words, the object of this invention is to avoid the cost of pressing a bearing lining material upon a bearing backing material. It will be noted that I have used the terms "steel", "babbitt" and "tin", but obviously other metals having the same characteristics may be substituted where such substitution is desired. For instance, bronze may be substituted for babbitt where the particular needs of the job permit the use of bronze.

To the accomplishment of the foregoing and related ends, said invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Figure 2:
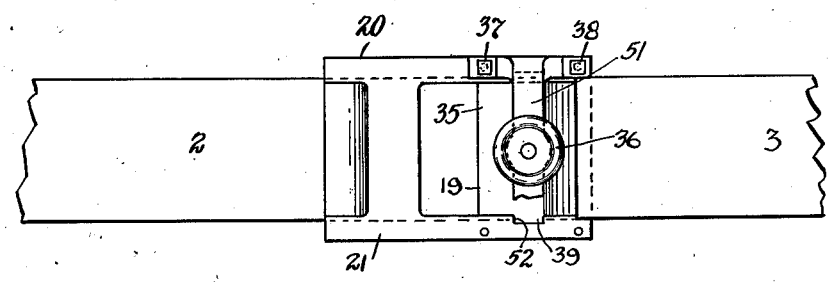

Fig. 1 is a vertical section with parts in elevation; and Fig. 2 is a plan view taken from above of the pouring gate shown in Fig. 1.

Referring now to Fig. 1, a strip of steel 1 is shown being fed into a receptacle 10. The strip 1 may be scarified or otherwise treated to insure bonding of the tin thereto, but ordinarily such a step is not necessary. This strip is led over an idle roller 12 and passes down into the bath of tin 11 where it is engaged by another roller 23, this roller being immersed in the tin, which forces the strip downwardly to a depth at which the upper surface will obtain a uniform regulated coating of tin. A pair of wipers are shown between immersion roller 23 and idler roller 13 and these wipers comprise holders 4 and 5 which grip felts 6 and 7, respectively, the function of the wipers being to smooth off the tin coating and remove any excess. The angle between the immersion roller 23 and the two idle rollers 12 and 13 will be noted to be rather sharp for an apparatus for the treatment of strip metal, but the drawing must necessarily be restricted and the disclosure illustrates the principle of the invention only. In actual practice I have obtained better results by increasing the angle between the three rollers, as an increase of angle allows the upper surface of the steel strip 1 to obtain more tin proportionately. The strip 1 with its coating 2 is then led over the idle roller 13 which may cause some of the tin on the under structure to be removed, but this is immaterial in view of the fact that the babbitt is bonded to the upper surface. However, a minute layer still clings to the under surface and this is very desirable as such a layer effectively prevents the formation of rust which forms very quickly when the steel is heated to high temperatures.

Closely adjacent the tin bath a heat chamber 14 is provided having an inlet 25 through which the strip passes. Located intermediately of the heat chamber a pouring gate will be seen, this gate consisting of a vertical throat 19, transverse vertical portions 16 and 35 and longitudinal vertical sides 20 and 21. The vertical throat portion 19 of the partition 35 gradually merges into a horizontal surface forming a sizing opening 29 in conjunction with the lower portion 15 of the pouring gate, the said portion 15 having downturned edges 8 and 9 so as to offer the least resistance to passage of the strip thereover. Situated directly above the throat 19, a ladle 17 is shown, which swings about an axis 50 and from which a charge of molten babbitt 18 will be seen to pass downwardly into the pouring throat. This ladle may be fed through an opening (not shown) in the upper horizontal portion 30 of the heat chamber 14, or the ladle may have an extending horizontal neck so that it may be fed from the outer vertical side. The contour of the interior of the pouring gate, that is, the curved portion from 19 to 29, cooperates with the passage of the strip to compact the molten babbitt into a uniform even layer, and the size of this layer may be regulated by adjusting the partition 35 either upwardly or downwardly, such positioning being effected by means of the adjusting screw 22 which is fixed to the partion 35 and is screwthreadedly engaged in the cross arm 51. The partition 35 is locked in the desired position by means of a lock nut which prevents rotation of the screw threaded shaft 22 and consequent movement of the partition 35. The shaft 22 is surmounted by a hand wheel 36 so as to enable easy adjustment of the sizing opening. The entire adjustment mechanism and the partition 35 are carried by the cross arm 51 which, in turn, is supported by standards resting upon the sides 20 and 21, the said standards being held in place by bolts 37 and 38. The shoulders, one of which is shown at 39, on the ends of the partition 35 maintain the partition in one vertical plane, by engaging the slots 52, and thus the sizing opening at 29 is always kept truly horizontal. These shoulders extend from the top downwardly about half way, and the same is true of the slots 52, this construction permitting adjustment through a wide range, but avoiding the possibility of loss of babbitt, such as would occur if the shoulders and slots were full length.

The method of forming bearings in my improved apparatus is as follows:

A strip of steel is fed into a tin bath where a pair of wipers may remove excess tin from both surfaces and smooth off the tin upon the upper surface. The strip is then led into a heat chamber within which a pouring gate is provided. As the strip passes through the pouring gate, molten metal is deposited thereon in such a manner that a compact layer of this metal results, due to the peculiar construction of the pouring gate. The strip is then led out of the heat chamber, blanked to the desired size and formed into either whole or half round bearings.

From the foregoing description it will be seen that I have provided a novel means for making bearings which is both economical and superior to prior means. It will be especially noted that the necessity for pressing layers of a composite strip is dispensed with, and that a layer of bearing metal is integrally united to a layer of steel by merely pouring said bearing metal upon the steel. As additional advantages, it will be seen that, in the event of replacement, the cost of removing the old babbitt is avoided, and that the composite bearing can be slipped into place quickly and easily, without turning the housing. As a further and important advantage my invention will be seen to provide a continuous process resulting in a much better bond because no time is lost in transferring from the tinning operation to the babbitting operation. In the present day practice there is a time interval between these two operations, during which it is almost impossible to prevent oxidation of the tin. My process is free from this objection, and also the possibility of the tin setting up and hardening beyond workable limits.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In an apparatus for manufacturing strip bearing material, the combination of a heating chamber, a reservoir disposed within said chamber for containing a pool of molten bearing metal, said reservoir having a bottom wall and end walls, an entrance and an exit opening for the passage of a backing metal strip between said bottom wall and said end walls, whereby the under side of the strip contacts with said bottom wall.

2. In an apparatus for manufacturing strip bearing material, the combination of a heating chamber, a reservoir disposed within said chamber for containing a pool of molten bearing metal, said reservoir having a bottom wall and end walls, an entrance and an exit opening for the passage of a backing metal strip between said bottom wall and said end walls, whereby the under side of the strip contacts with said bottom wall, the end wall of said reservoir leading to said exit opening being gradually curved from a vertical to a horizontal plane.

3. In an apparatus for manufacturing strip bearing material, the combination of a heating chamber, a reservoir disposed within said chamber for containing a pool of molten bearing metal, said reservoir having a bottom wall and end walls, an entrance and an exit opening for the passage of a backing metal strip between said bottom wall and said end walls, whereby the under side of the strip contacts with said bottom wall, the end wall of said reservoir leading to said exit being gradually curved from a vertical to a horizontal plane, and means for adjusting the heighth of said last named end wall with respect to said bottom wall.

JOHN V. O. PALM.